United States Patent [19]

Mathews, Sr.

[11] Patent Number: 4,637,114
[45] Date of Patent: Jan. 20, 1987

[54] RIVETING APPARATUS

[76] Inventor: Jimmie C. Mathews, Sr., 717 Mountain Dr., Birmingham, Ala. 35206

[21] Appl. No.: 747,323

[22] Filed: Jun. 21, 1985

[51] Int. Cl.$^4$ .............................................. B25B 27/00
[52] U.S. Cl. ................................ 29/243.54; 227/104
[58] Field of Search .................. 29/243.53, 243.54; 227/99, 103–105; 72/448, 311

[56] References Cited

U.S. PATENT DOCUMENTS

| | | | |
|---|---|---|---|
| 1,131,321 | 3/1915 | Bliss et al. | 227/104 |
| 2,034,408 | 3/1936 | McClure | 227/105 |
| 3,046,643 | 7/1962 | Sharpe | 227/105 |
| 3,911,555 | 10/1975 | Allen et al. | 29/243.53 X |
| 4,131,965 | 1/1979 | von den Benken et al. | 227/104 X |

Primary Examiner—Frederick R. Schmidt
Assistant Examiner—Steven P. Schad
Attorney, Agent, or Firm—Jennings, Carter, Thompson & Veal

[57] ABSTRACT

A rivet press for sequentially compressing rivets to assemble a plurality of disc-like or ring-like members utilizes a movable and rotatable carriage to position the rivets of the assembly beneath a suspended hydraulic ram. The carriage can position the assembly for compressing the rivets at any radius and in any pattern desired. The hydraulic ram provides constant and consistent pressure at an invariant compression angle to insure uniformity of spacing and compression of the elements.

7 Claims, 3 Drawing Figures

RIVETING APPARATUS

BACKGROUND OF THE INVENTION

The present invention relates to apparatus for binding together a plurality of elements with one or more axially extending rivets. More particularly the present invention relates to apparatus for riveting together a plurality of generally planar disc-like or ring-like elements. Even more particularly the present invention relates to an apparatus for riveting together a plurality of planar elements which share a common control axis, wherein the radial distance from said common axis to said rivet varies. In even greater particularity the present invention may be described as an apparatus for rebuilding clutch assemblies or the like which is adjustable laterally and angularly such that any size clutch assembly may be rebuilt.

Clutch and pressure plate assembly rebuilding currently is a common practice particularly among facilities that service truck fleets or rental vehicle fleets. It is estimated that there are roughly 3,000 facilities in the U.S. which are available to the public where such work can be performed. Most of these facilities are not dedicated facilities; that is, they do not limit their work to a particular line of automobile or a particular size clutch plate. Thus, the number, spacing, orientation, and location of the rivets used to hold the assembly together will vary with the particular assembly. The original equipment manufacturer, in contrast to the rebuilder, is able to continuously fabricate assemblies of the same size and consequently he may use a press to secure all the rivets on an assembly at a single stroke. This press would have a lower jig or anvil piece made for the particular assembly and a ram configured for the assembly. Since the use of such a piece of equipment would not be economical or efficient for a rebuilder it is the practice of the rebuilder to use an air hammer to sequentially flatten the rivets in a rebuilt assembly. Although a spider is conventionally used to hold the assembly in place, the rebuilder must hold the air hammer in relation to the individual rivets. Consequently, there is an inherent margin of error in the striking angle and the force of impact on each rivet, which leads to a non-uniform spacing and compression of the assembly elements. This nonuniformity is not readily detectable until the assembly has been removed from the spider at which point the severity of the non-uniformity is evaluated to determine whether the job must be redone. Also, performing the work in this manner is tedious and fatigues the rebuilder.

SUMMARY OF THE INVENTION

It is an object of my invention to provide a universal device for riveting clutch or pressure plate assemblies and the like togehter, regardless of the radius of the assembly.

Another object of my invention is to provide a universal device for riveting such an assembly with uniform spacing and compression of the assembly elements.

Yet another object of the invention is to provide a universal device for riveting such an assembly which is efficient, economical, and easy to use.

To accomplish these and other objects of my invention, I utilize a vertically suspended hydraulic ram which is supported at a fixed reference location by a frame. Beneath the hydraulic ram and also supported by the frame, I employ a carriage to move the assembly to be riveted horizontally with respect to a reference position directly below the vertical hydraulic ram. Mounted atop the carriage is a turntable which can rotate about a vertical axis so that the assembly to be riveted can be moved angularly whereby successive rivets at the same radial distance from the center of the assembly can be positioned directly below the ram. A pneumatic cylinder mounted beneath and carried by the carriage has a rod, extending upwards through the carriage, turntable, and assembly with a fitting attached to the end for holding the assembly together when the ram is affixing the rivets. Inasmuch as the hydraulic pressure applied is controlled, the compression of each rivet and the angle of impact on each rivet is therefore controlled within much narrower tolerances than can be achieved using an air hammer.

DESCRIPTION OF THE DRAWINGS

Apparatus embodying features of my invention are depicted in the accompanying drawings which form a portion of this application wherein.

DESCRIPTION OF A PREFERRED EMBODIMENT

Figure 1:
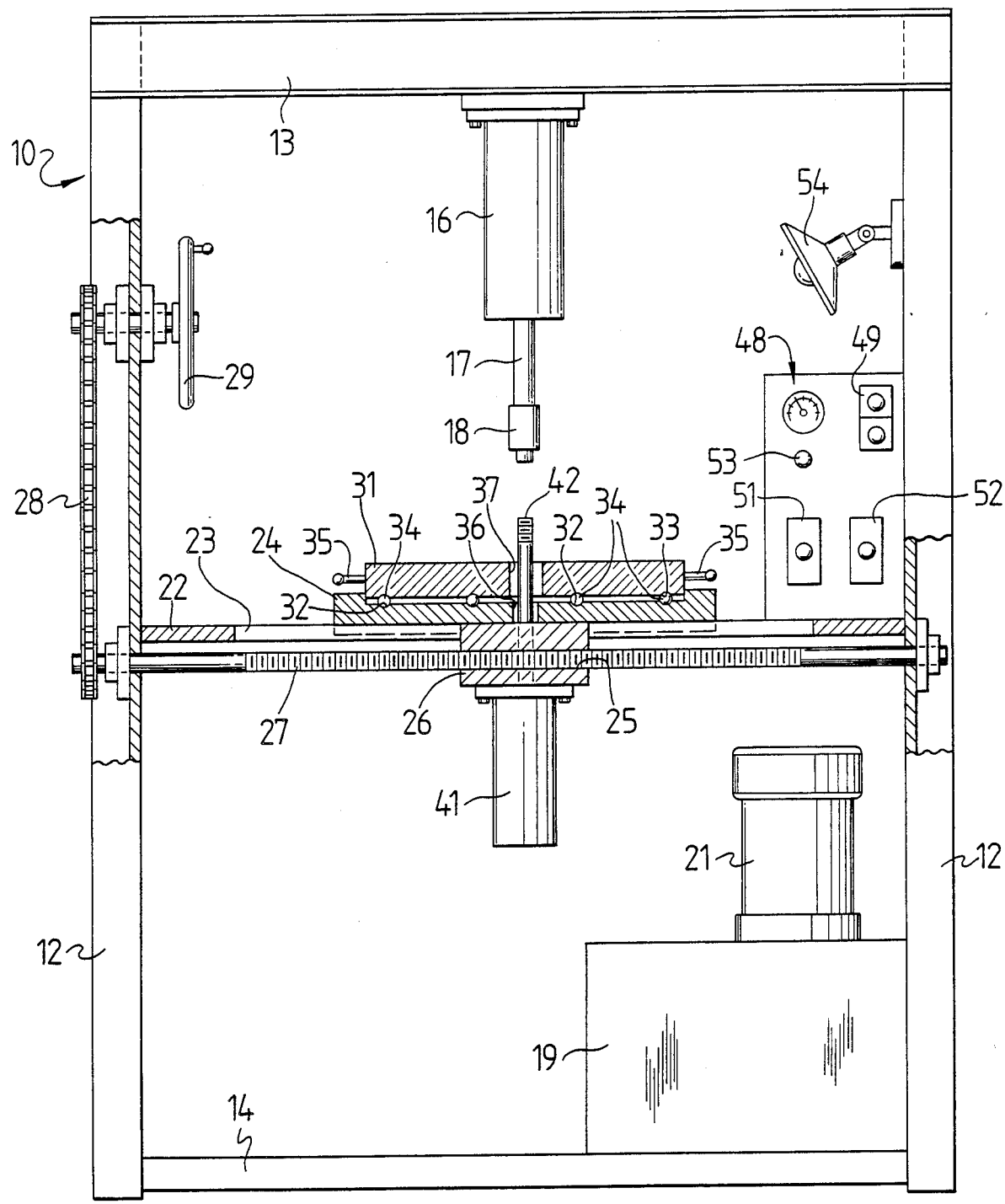
FIG. 1 is an elevational view of the device partially broken away and in section to show the traveling block and worm.

My invention is intended to be a stationary work station in a clutch rebuilding shop or other facility operated by an auto parts' rebuilder. As such, and as shown in FIG. 1, it uses a heavy duty metal frame 10 which includes vertical side members 12, a horizontal top member 13 and a lower brace 14. Suspended from and affixed to the horizontal top member 13 is a hydraulic cylinder 16 which drives a rod 17 extending downwardly therefrom. The lowermost end of the rod 17 is threaded to engage any of a plurality of ram elements 18 which are shaped in accordance with the rivets used, such as for use with a button rivet. The hydraulic lines running to the hydraulic cylinder 16 are conventional and are not shown in the interest of clarity. The apparatus has associated therewith a self-contained tank 19 and motor 21 which supplies hydraulic fluid under pressure, although shop pressure may be used if it is available. The tank 19 and motor 21 may be conveniently mounted on lower brace 14, as shown.

Mounted between the vertical side members 12 is a horizontally extending bottom plate guide 22 which has a slot 23 formed therein. A bottom plate 24 which is generally rectangular in shape rests atop the guide 22 over the slot 23. Depending from this bottom plate 24 through the slot 23 is a travel block 26 which has a threaded aperture 25 extending horizontally therethrough to engage an elongated rotatable worm 27, which is also mounted between the vertical side members 12. The worm 27 is connected by a chain 28 to a hand wheel 29 which is used to turn the worm 27 to move the bottom plate 24 to selected positions along the guide 22.

Figure 2:
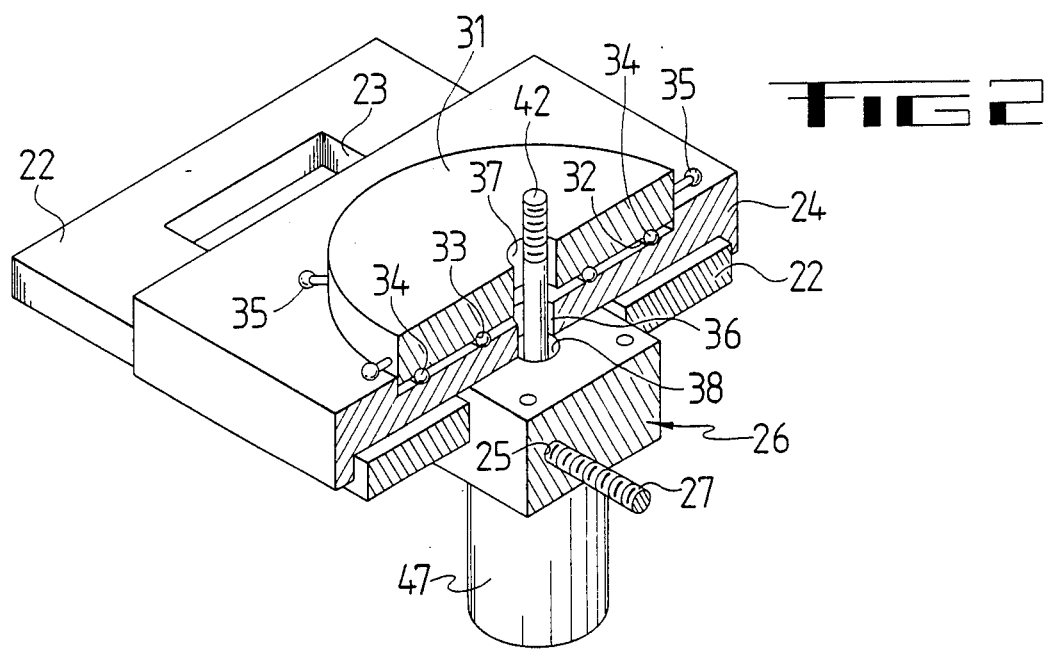
FIG. 2 is a perspective view of the carriage and turntable shown in section; and, FIG. 3 is an exploded view of an assembly above a jig for rebuilding such an assembly.

An upper plate or turntable 31 having a plurality of radially extending handles 35 is mounted for rotation atop bottom plate 24. Bottom plate 24 has on its upper surface a plurality of circular grooves or races 32 which cooperate with a plurality of circular races 33 on the bottom of the turntable 31, as shown in FIGS. 1 and 2. A plurality of bearings 34 captured within the races support the turntable 31 so that it may rotate freely regardless of the axial stress placed thereon. Both bottom plate 24 and turntable 31 have central apertures 36 and 37, respectively, extending vertically therethrough. The travel block 26 also has an aperture 38 aligned vertically with apertures 36 and 37. Mounted to the underside of travel block 26 is a pneumatic cylinder 41. The cylinder 41 has a retractable rod 42 which extends upwardly through apertures 36–38. The retractable rod 42 is threaded at its upper end to engage a jig mounting extension 43 or an anvil, not shown. Conventional air lines, air filter, air lubricator and gauges are associated with the pnuematic cylinder 41 and may be mounted in any convenient manner, not shown. In use, a centrally apertured jig 44 is positioned atop turntable 31 and surrounds the jig mounting extension 43. The extension itself is threaded to receive thereon a retainer 46 which holds the assembly, such as a clutch-like assembly, to the jig 44. The rod 42 may be retracted by clinder 41 thus clamping the assembly between the retainer 46 and the jig 44. The retainer 46 has a thrust bearing 47 thereon which allows the turntable 31, jig 44 and the assembly to be rotated by the rebuilder.

Mounted adjacent one vertical side member 12 is a control panel 48 which the rebuilder uses to operate the device. The control panel 48 contains on/off switches 49 to control electric power, a hydraulic valve lever 51 to actuate the cylinder 16, a pneumatic valve lever 52 to actuate cylinder 41, and a hydraulic adjustment 53 to vary the hydraulic pressure exerted by the cylinder 16. Above the control panel 48 and illuminating the turntable 31 is a spotlight 54.

Figure 3:
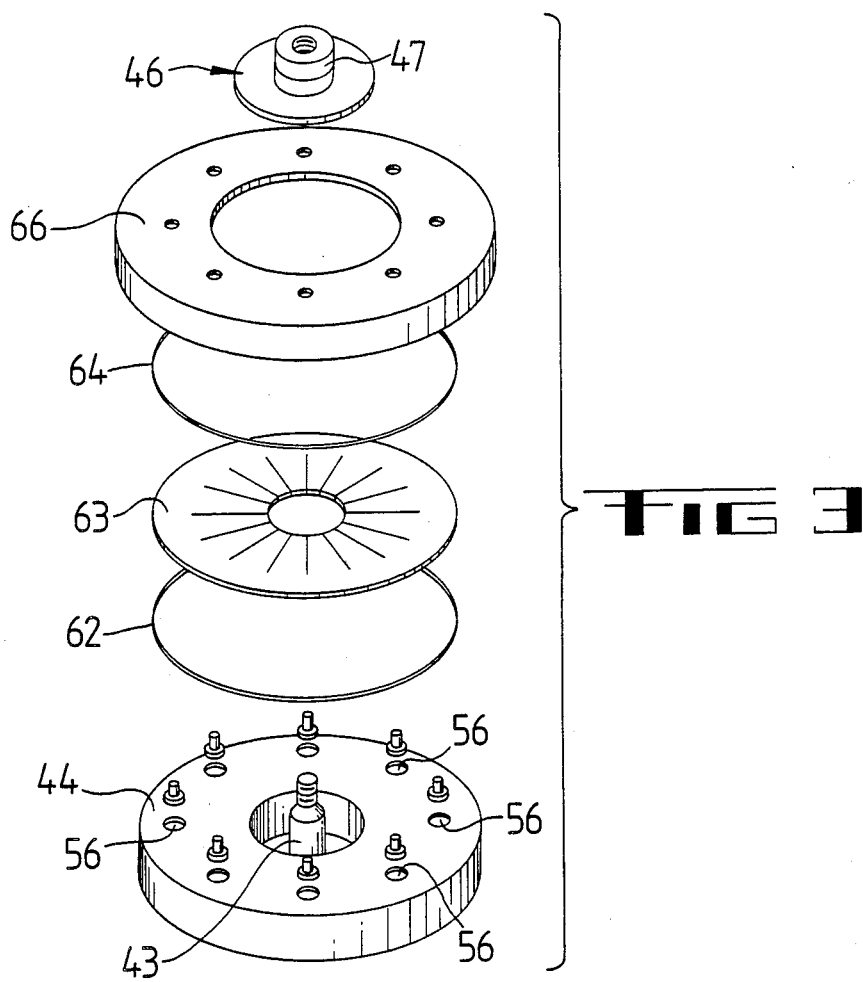

In operation, the extension 43 is telescoped over and attached to the rod 42 extending upwardly from air cylinder 41. The jig 44 is placed on the turntable 31 with the aperture 38 aligned with the apertures 36 and 37. It should be noted that the jig 44 is a standard item selected from a number of commercially available patterns having a plurality of indentations 56 for positioning the usual fastening rivets in the assembly. The pattern and number of indentations is dependent upon the type assembly being rebuilt. The rivets are placed in the indentations 56, then the elements of the assembly, such as a clutch assembly, are placed on the jig in cooperation with the rivets. In FIG. 3 a pressure plate assembly having a first fulcrum ring 62, a diaphram 63, a second fulcrum ring 64, and a cover 66 are to be riveted together. These elements are mounted vertically atop the jig 44 and the retainer 46 is attached to extension 43. Air cylinder 41 is then actuated to draw the retainer 46 down onto the assembly. The wheel 29 is then turned to position one of the rivets beneath the ram element 18. The proper hydraulic pressure to compress the rivet is set and the cylinder 16 is actuated to lower the ram element 18 and compress the rivet. The ram element 18 is withdrawn and the handles 35 are used to rotate the turntable 31, the jig 44, and the assembly to the next rivet. This rivet and each subsequent rivet are compressed with the same force and at the same angle as was the first rivet, although the compressive force exerted could be changed for any rivet if desired. It should therefore be apparent that my apparatus is a very versatile machine capable of consistent repetition of the same force or of a selected force on any assembly with any pattern and number of rivets required at any radius or offset from the center of the assembly; therefore it can be used to reliably and accurately compress the rivets of any clutch-like assembly to assure uniform spacing and compression of the elements thereof.

While I have shown my invention in but one form, it will be obvious to those skilled in the art that it is not so limited, but is susceptible of various other changes and modifications without departing from the spirit thereof.

What I claim is:

1. Apparatus for fastening disc-like members together uniformly in spacing and compression with a plurality of compressive fasteners, comprising in combination:
    (a) an upright frame including a top support member;
    (b) an elongated horizontal threaded member mounted for rotation within said frame in spaced relation to said top support member;
    (c) a carriage having a central vertical aperture mounted within said frame with said carriage engaging said threaded member such that rotation of said threaded member translates said carriage horizontally within said frame;
    (d) a turntable having a central vertical aperture mounted atop said carriage with the apertures thereof vertically aligned;
    (e) a hydraulic ram depending from said top support member at a reference position above said carriage and turntable; and
    (f) a pneumatically actuated retainer cooperatively mounted beneath said carriage and extending upwards through said apertures to engage and hold said disc-like members.

2. Apparatus as defined in claim 1 wherein said carriage comprises:
    (a) a plate supporting said turntable on the top thereof;
    (b) a horizontal track carried by said frame and supporting said plate; and
    (c) a travel block depending from and connected to said plate with said travel block engaging said threaded member.

3. Apparatus as defined in claim 2 wherein said pneumatically actuated retainer comprises:
    (a) a pneumatic cylinder mounted beneath said travel block with said cylinder having a retractable threaded rod extending upwards through said vertically aligned apertures;
    (b) a jig of predetermined configuration having a central aperture, mounted on said turntable; and
    (c) means threadedly engaging said threaded rod for holding said disc-like members in a fixed position on said jig upon retraction of said rod.

4. Apparatus for fastening disc-like members together, uniformly in spacing and compression, with a plurality of compression fasteners comprising, in combination:
    (a) an upright frame including a top support member;
    (b) carriage means mounted in said frame a predetermined distance below said top support member for translating said disc-like members horizontally thereon;
    (c) horizontally rotatable means for translating said disc-like members angularly thereon about the center of said rotatable means with said rotatable means and said carriage means having vertically aligned apertures extending therethrough;
    (d) means depending from said top support member for exerting a compressive force upon each fastener sequentially, with said fasteners cooperatively positioned by said carriage means and said rotatable means; and (e) means attached to said carriage means for holding said disc-like members on said rotatable means in alignment with one another and said plurality of fasteners including a pneumatic cylinder depending from said carriage means with said cylinder having a retractable rod extending upwards through said vertically aligned apertures, a jig of predetermined configuration having a central aperture, with said jig mounted atop said rotatable means whereby said central aperture is aligned with said vertically aligned apertures, and threaded means threadedly engaging said retractable rod for holding said disc-like members in a fixed position on said jig upon retraction of said rod.

5. Apparatus as defined in claim 4 wherein said threaded means includes a thrust bearing whereby said rotatable means and said jig may turn while said rod is retracted.

6. Apparatus as defined in claim 4 wherein said jig supports said fasteners for compression in cooperation with said means for exerting a compressive force.

7. Apparatus for fastening disc-like members together, uniformly in spacing and compression, with a plurality of compression fasteners, comprising in combination:

(a) an upright frame including a top support member;

(b) a horizontally rotatable means for translating said disc-like members angularly thereon about the center of said rotatable means;

(c) carriage means mounted in said frame a predetermined distance below said top support member for translating said disc-like member horizontally thereon, including a plate adapted to support said rotatable means, a horizontal guide track mounted to said frame and supporting said plate, a travel block depending from and connected to said plate with said travel block, said plate, and said horizontally rotatable means having vertically aligned apertures therethrough, an elongated threaded member mounted beneath said track and engaging said travel block whereby rotation of said threaded member moves said block along said track, and means for rotating said threaded member;

(d) means depending from said top support member for exerting a compressive force upon each fastener sequentially, with said fasteners being cooperatively positioned by said carriage means and said rotatable means; and (e) means attached to said carriage means for holding said disc-like members on said rotatable means in alignment with one another and said plurality of fasteners, including a pneumatic cylinder mounted beneath said travel block with said cylinder having a retractable threaded rod extending upwards through said vertically aligned apertures, a jig of predetermined configuration, having a central aperture mounted on said rotatable means, and means threadedly engaging said threaded rod for holding said disc-like members in a fixed position upon retraction of said rod.

* * * * *